(12) United States Patent
Brissenden et al.

(10) Patent No.: US 7,201,266 B2
(45) Date of Patent: *Apr. 10, 2007

(54) HYDRAULIC CLUTCH ACTUATION SYSTEM

(75) Inventors: James S. Brissenden, Baldwinsville, NY (US); Timothy M. Burns, Elbridge, NY (US); Sankar K. Mohan, Jamesville, NY (US); Eric A. Bansbach, Fayetteville, NY (US); Steven W. O'Hara, Cicero, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/450,927

(22) Filed: Jun. 9, 2006

(65) Prior Publication Data

US 2006/0231368 A1 Oct. 19, 2006

Related U.S. Application Data

(63) Continuation of application No. 11/287,711, filed on Nov. 28, 2005, now Pat. No. 7,059,462, which is a continuation of application No. 10/730,461, filed on Dec. 8, 2003, now Pat. No. 6,997,299.

(60) Provisional application No. 60/490,895, filed on Jul. 28, 2003.

(51) Int. Cl.
*F16D 25/12* (2006.01)
*B60K 17/344* (2006.01)

(52) U.S. Cl. .................................. 192/85 R; 180/248
(58) Field of Classification Search ..................... None
See application file for complete search history.

(56) References Cited

U.S. PATENT DOCUMENTS

| | | | |
|---|---|---|---|
| 2,837,192 A | 6/1958 | Dunkelow |
| 4,862,769 A | 9/1989 | Koga et al. |
| 4,895,236 A | 1/1990 | Sakakibara et al. |
| 4,984,663 A | 1/1991 | Kato |
| 5,224,906 A | 7/1993 | Sturm |
| 5,323,871 A | 6/1994 | Wilson et al. |
| 5,407,024 A | 4/1995 | Watson et al. |
| 5,794,739 A | 8/1998 | Ring et al. |
| 6,354,977 B1 | 3/2002 | Brown et al. |
| 6,446,774 B2 | 9/2002 | Porter |

(Continued)

FOREIGN PATENT DOCUMENTS

| | | |
|---|---|---|
| JP | 2018117 | 1/1990 |
| JP | 3066927 | 3/1991 |

*Primary Examiner*—Rodney H. Bonck
(74) *Attorney, Agent, or Firm*—Harness, Dickey & Pierce, P.L.C.

(57) ABSTRACT

A torque transfer mechanism for controlling the magnitude of a clutch engagement force exerted on a clutch pack that is operably disposed between a first rotary member and a second rotary member includes a hydraulic clutch actuation system. The hydraulic clutch actuation system includes a primary fluid circuit coupled to a secondary fluid circuit by a pressure intensifier. The pressure intensifier provides magnified pressure to a piston for actuating the clutch pack.

22 Claims, 12 Drawing Sheets

U.S. PATENT DOCUMENTS

| | | |
|---|---|---|
| 6,595,086 B2 | 7/2003 | Kobayashi |
| 6,595,338 B2 | 7/2003 | Bansbach et al. |
| 6,612,957 B2 | 9/2003 | Bansbach et al. |
| 6,626,787 B2 | 9/2003 | Porter |
| 6,681,912 B2 | 1/2004 | Suzuki et al. |
| 6,997,299 B2 * | 2/2006 | Brissenden et al. ........ 192/85 R |
| 7,021,445 B2 * | 4/2006 | Brissenden et al. ........ 192/85 R |
| 7,059,462 B2 * | 6/2006 | Brissenden et al. ........ 192/85 R |
| 2002/0162722 A1 | 11/2002 | Suzuki et al. |

* cited by examiner

HYDRAULIC CLUTCH ACTUATION SYSTEM

CROSS-REFERENCE TO RELATED APPLICATIONS

This application is a continuation of U.S. Ser. No. 11/287,711 filed Nov. 28, 2005, now U.S. Pat. No. 7,059,462 issued Jun. 13, 2006, which is a continuation of U.S. Ser. No. 10/730,461 filed Dec. 8, 2003, now U.S. Pat. No. 6,997,299 issued Feb. 14, 2006, which claims benefit to Provisional U.S. Ser. No. 60/490,895 filed Jul. 28, 2003.

FIELD OF THE INVENTION

The present invention relates generally to power transfer systems for controlling the distribution of drive torque between the front and rear drivelines of a four-wheel drive vehicle. More particularly, the present invention is directed to a hydraulic clutch actuation system adapted for use in motor vehicle driveline applications.

BACKGROUND OF THE INVENTION

In view of increased demand for four-wheel drive vehicles, many power transfer systems are currently being incorporated into vehicular driveline applications for transferring drive torque to the wheels. In some vehicles, a transfer case is interconnected between the primary and secondary drivelines. The transfer case is equipped with a dog-type mode clutch that can be selectively engaged for rigidly coupling the secondary driveline to the primary driveline to establish a part-time four-wheel drive mode. In contrast, when the mode clutch is disengaged, drive torque is only delivered to the primary driveline for establishing a two-wheel drive mode.

A modern trend in four-wheel drive motor vehicles is to equip the transfer case with an electronically-controlled transfer clutch in place of the mode clutch. The transfer clutch is operable to automatically direct drive torque to the secondary wheels, without any input or action on the part of the vehicle operator. When traction is lost at the primary wheels, an "on-demand" four-wheel drive mode is established. Typically, the transfer clutch includes a multi-plate clutch assembly that is installed between the primary and secondary output shafts of the transfer case and which is actuated by a power-operated clutch actuator in response to control signals sent from a controller. The control signals are typically based on current operating characteristics of the vehicle (i.e., vehicle speed, interaxle speed difference, acceleration, steering angle, etc.) as detected by various sensors. Thus, such "on-demand" transfer cases can utilize adaptive control schemes for automatically controlling torque distribution during all types of driving and road conditions.

In many instances, the vehicle operator is also permitted to select between the two-wheel drive mode and the part-time four-wheel drive mode in addition to the on-demand four-wheel drive mode. Specifically, when the two-wheel drive mode is selected, the clutch assembly is released for delivering all drive torque to the primary output shaft. In contrast, when the part-time four-wheel drive mode is selected, the clutch assembly is fully engaged for effectively locking the secondary output shaft to the primary output shaft. In such applications, a mode signal is sent to the controller which is indicative of the particular drive mode selected by the vehicle operator. Typically, the mode signal is generated by a mode selector device which is manipulated by the vehicle operator.

Currently, many on-demand transfer cases are equipped with a power-operated clutch actuator that can automatically regulate the amount of drive torque transferred to the secondary output shaft as a function of the value of an electrical control signal applied thereto. In some applications, the transfer clutch employs an electromagnetic clutch as the power-operated actuator. For example, U.S. Pat. No. 5,407,024 discloses an electromagnetic coil that is incrementally activated to control movement of a ball-ramp operator for applying a clutch engagement force on a multi-plate clutch assembly. Likewise, Japanese Laid-open Patent Application No. 62-18117 discloses a transfer clutch equipped with an electromagnetic actuator for directly controlling actuation of the multi-plate clutch pack assembly.

As an alternative, U.S. Pat. No. 5,323,871 discloses an on-demand transfer case having a transfer clutch equipped with an electric motor that controls rotation of a sector plate which, in turn, controls pivotal movement of a lever arm that is operable for applying a variable clutch engagement force on a multi-plate clutch assembly. Moreover, Japanese Laid-open Patent Application No. 63-66927 discloses a transfer clutch which uses an electric motor to rotate one cam plate of a ball-ramp operator for engaging a multi-plate clutch assembly. Finally, U.S. Pat. No. 4,895,236 discloses a transfer case equipped with a transfer clutch having an electric motor driving a reduction gearset for controlling movement of a ball screw operator which, in turn, applies the clutch engagement force to the clutch pack.

While many on-demand clutch control systems similar to those described above are currently used in four-wheel drive vehicles, a need exists to advance the technology and address recognized system limitations. For example, the size, weight and electrical power requirements of the electromagnetic coil or the electric motors needed to provide the described clutch engagement loads may make such system cost prohibitive in some four-wheel drive vehicle applications.

SUMMARY OF THE INVENTION

Thus, it is an object of the present invention to provide a hydraulic clutch actuation system having a low pressure hydraulic circuit coupled to a high pressure hydraulic circuit through a pressure intensifier. The high pressure circuit supplies a hydraulically operated clutch actuator that is operable for engaging a transfer clutch.

It is a further object of the present invention to provide a hydraulic clutch actuation system having a high pressure circuit for supplying an engagement force to an on-demand lubrication pump.

As a related object, the hydraulic clutch actuation system of the present invention is well-suited for use in motor vehicle driveline applications to control the transfer of drive torque between an input member and an output member.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a hydraulic clutch actuation system that is well-suited for use with a transfer clutch for adaptively controlling the torque transferred from a rotary input member to a rotary output member. The transfer clutch finds particular application in motor vehicle drivelines as, for example, an on-demand clutch in a transfer case or in-line torque coupling, a biasing clutch associated with a differential assembly in a transfer case or a drive axle assembly or as a shift clutch in power transmission assemblies. Thus, while the present invention is hereinafter described in association with particular driveline applications, it will be understood that the arrangements shown and described are merely intended to illustrate exemplary embodiments of the present invention.

Figure 1:
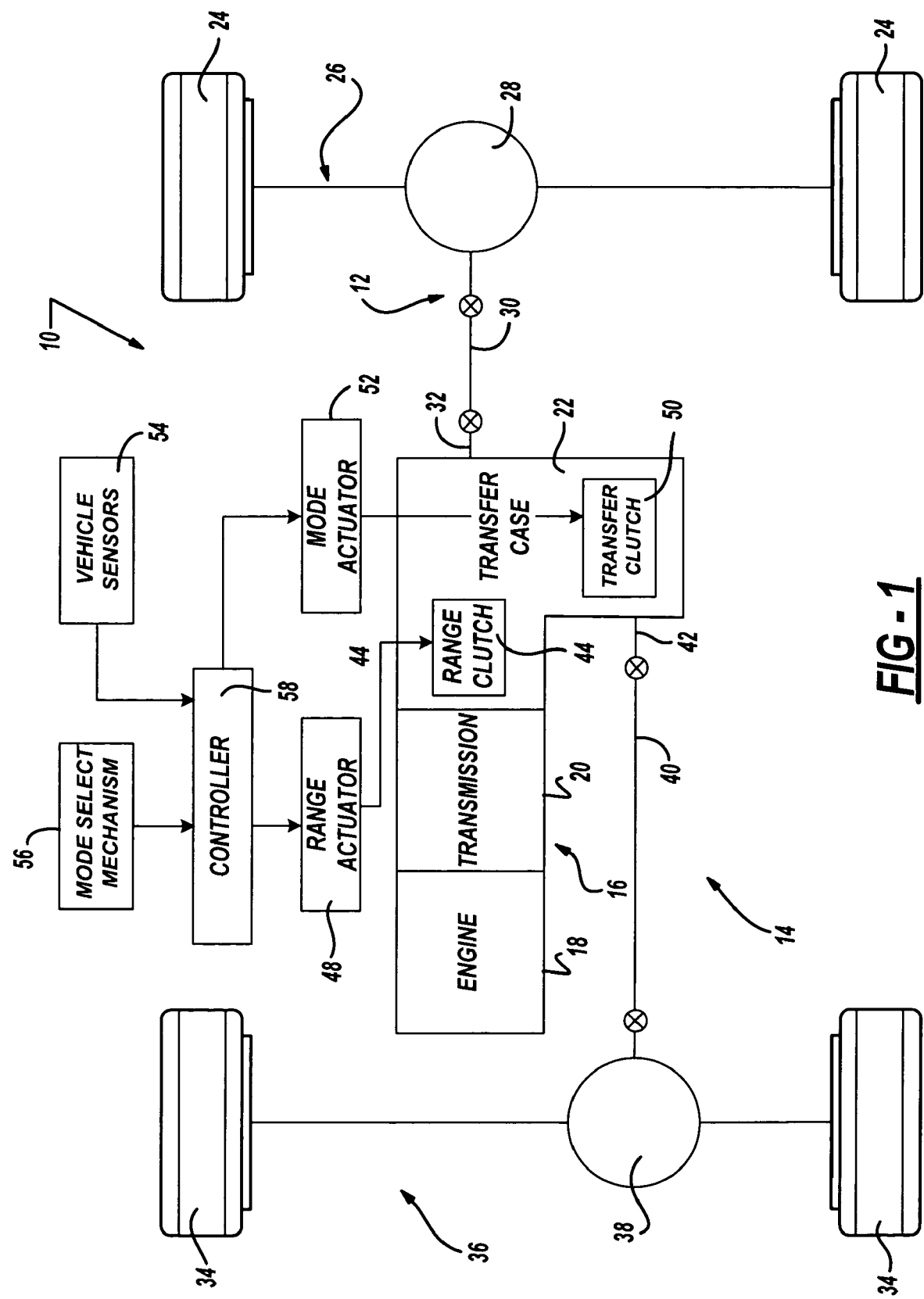
FIG. 1 illustrates the drivetrain of a four-wheel drive vehicle equipped with a transfer case incorporating the present invention.

With particular reference to FIG. 1 of the drawings, a drivetrain 10 for a four-wheel drive vehicle is shown. Drivetrain 10 includes a primary driveline 12, a secondary driveline 14 and a powertrain 16 for delivering rotary tractive power (i.e., drive torque) to the drivelines. In the particular arrangement shown, primary driveline 12 is the rear driveline while secondary driveline 14 is the front driveline. Powertrain 16 includes an engine 18, a multi-speed transmission 20 and a transfer case 22. Rear driveline 12 includes a pair of rear wheels 24 connected at opposite ends of a rear axle assembly 26 which has a rear differential 28. A rear drive shaft 30 interconnects rear differential 28 to a rear output shaft 32 of transfer case 22. Likewise, front driveline 14 includes a pair of front wheels 34 connected at opposite ends of a front axle assembly 36 which has a front differential unit 38. A front drive shaft 40 interconnects front differential 38 to a front output shaft 42 of transfer case 22.

With continued reference to FIG. 1, drivetrain 10 is shown to further include a power transfer system for permitting a vehicle operator to select between a two-wheel drive mode, a part-time four-wheel high-range drive mode, an on-demand four-wheel high-range drive mode, a neutral non-driven mode and a part-time four-wheel low-range drive mode. In this regard, transfer case 22 is equipped with a range clutch 44 that is operable for establishing the high-range and low-range drive connections between an input shaft 46 and rear output shaft 32, and a range actuator 48 that is operable for actuating range clutch 44. Transfer case 22 also includes a mode or transfer clutch 50 that is operable for transferring drive torque from rear output shaft 32 to front output shaft 42 for establishing the part-time and on-demand four-wheel drive modes. The power transfer system further includes a mode actuator 52 for actuating transfer clutch 50, vehicle sensors 54 for detecting certain dynamic and operational characteristics of the motor vehicle, a mode select mechanism 56 for permitting the vehicle operator to select one of the available drive modes and a controller 58 for controlling actuation of range actuator 48 and mode actuator 52 in response to input signals from vehicle sensors 54 and mode select mechanism 56.

Figure 2:
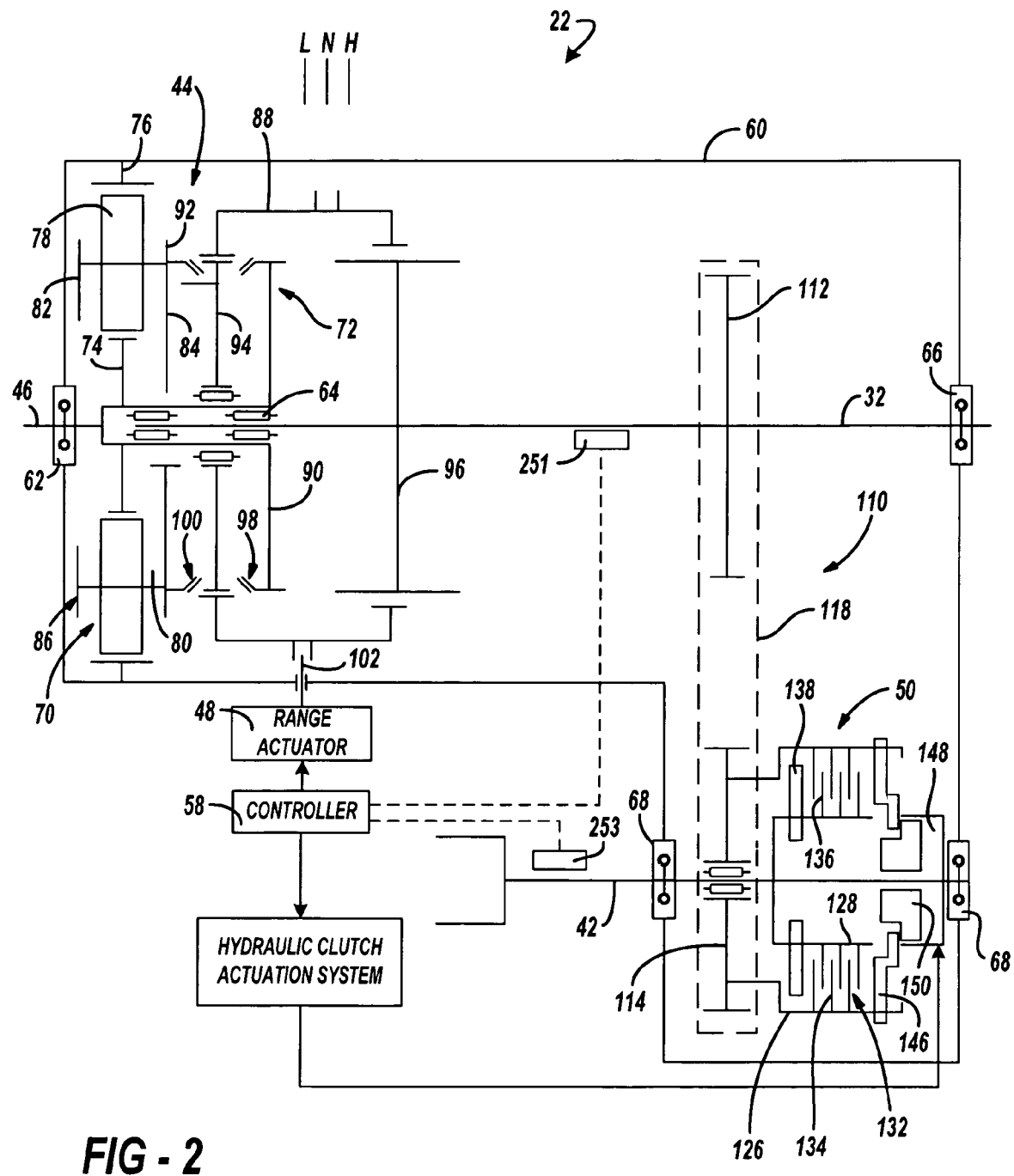
FIG. 2 is a schematic illustration of a transfer case equipped with the on-demand transfer clutch which is controlled by a hydraulic clutch actuation system of the present invention.

Transfer case 22 is shown schematically in FIG. 2 to include a housing 60 from which input shaft 46 is rotatably supported by bearing assembly 62. Input shaft 46 is adapted for connection to the output shaft of transmission 20. Rear output shaft 32 is also shown rotatably supported between input shaft 46 and housing 60 via bearing assemblies 64 and 66 while front output shaft 42 is rotatably supported from housing 60 by a pair of bearing assemblies 68. Range clutch 44 is shown to include a planetary gearset 70 and a synchronized range shift mechanism 72. Planetary gearset 70 includes a sun gear 74 fixed for rotation with input shaft 46, a ring gear 76 non-rotatably fixed to housing 60 and a set of planet gears 78 rotatably supported on pinion shafts 80 extending between front and rear carrier rings 82 and 84, respectively, that are interconnected to define a carrier 86.

Planetary gearset 70 functions as a two-speed reduction unit which, in conjunction with a sliding range sleeve 88 of synchronized range shift mechanism 72, is operable to establish either of a first or second drive connection between input shaft 46 and rear output shaft 32. To establish the first drive connection, input shaft 46 is directly coupled to rear output shaft 32 for defining a high-range drive mode in which rear output shaft 32 is driven at a first (i.e., direct) speed ratio relative to input shaft 46. Likewise, the second drive connection is established by coupling carrier 86 to rear output shaft 32 for defining a low-range drive mode in which rear output shaft 32 is driven at a second (i.e., reduced) speed ratio relative to input shaft 46. A neutral non-driven mode is established when rear output shaft 32 is disconnected from both input shaft 46 and carrier 86.

Synchronized range shift mechanism 72 includes a first clutch plate 90 fixed for rotation with input shaft 46, a second clutch plate 92 fixed for rotation with rear carrier ring 84, a clutch hub 94 rotatably supported on input shaft 46 between clutch plates 90 and 92, and a drive plate 96 fixed for rotation with rear output shaft 32. Range sleeve 88 has a first set of internal spline teeth that are shown meshed with external spline teeth on clutch hub 94, and a second set of internal spline teeth that are shown meshed with external spline teeth on drive plate 96. As will be detailed, range sleeve 88 is axially moveable between three distinct positions to establish the high-range, low-range and neutral modes. Range shift mechanism 72 also includes a first synchronizer assembly 98 located between hub 94 and first clutch plate 90 and a second synchronizer assembly 100 is disposed between hub 94 and second clutch plate 92. Synchronizers 98 and 100 work in conjunction with range sleeve 88 to permit on-the-move range shifts.

With range sleeve 88 located in its neutral position, as denoted by position line "N", its first set of spline teeth are disengaged from the external clutch teeth on first clutch plate 90 and from the external clutch teeth on second clutch plate 92. First synchronizer assembly 98 is operable for causing speed synchronization between input shaft 46 and rear output shaft 32 in response to sliding movement of range sleeve 88 from its N position toward a high-range position, denoted by position line "H". Upon completion of speed synchronization, the first set of spline teeth on range sleeve 88 move into meshed engagement with the external clutch teeth on first clutch plate 90 while its second set of spline teeth are maintained in engagement with the spline teeth on drive plate 96. Thus, movement of range sleeve 88 to its H position acts to couple rear output shaft 32 for common rotation with input shaft 46 and establishes the high-range drive connection therebetween. Similarly, second synchronizer assembly 100 is operable for causing speed synchronization between carrier 86 and rear output shaft 32 in response to sliding movement of range sleeve 88 from its N position to a low-range position, as denoted by position line "L". Upon completion of speed synchronization, the first set of spline teeth on range sleeve 88 move into meshed engagement with the external clutch teeth on second clutch plate 92 while the second set of spline teeth on range sleeve 88 are maintained in engagement with the external spline teeth on drive plate 96. Thus with range sleeve 88 located in its L position, rear output shaft 32 is coupled for rotation with carrier 86 and establishes the low-range drive connection between input shaft 46 and rear output shaft 32.

To provide means for moving range sleeve 88 between its three distinct range positions, range shift mechanism 72 further includes a range fork 102 coupled to range sleeve 88 and which is mounted on a shift rail (not shown) for axial movement thereon. Range actuator 48 is a power-operated mechanism that is operable to move range fork 102 on the shift rail for causing corresponding axial movement of range sleeve 88 between its three range positions. Range actuator 48 may include an electric motor that is arranged to move range sleeve 88 to a specific range position in response to a control signal from controller 58 based on the signal delivered to controller 58 from mode select mechanism 56. As an alternative, range actuator 48 may be integrated into the hydraulic clutch actuation systems to be described in greater detail hereinafter.

It will be appreciated that the synchronized range shift mechanism permits "on-the-move" range shifts without the need to stop the vehicle which is considered to be a desirable feature. However, other synchronized and non-synchronized versions of range clutch 44 can be used in substitution for the particular arrangement shown. Also, it is contemplated that range clutch 44 can be removed entirely from transfer case 22 such that input shaft 46 would directly drive rear output shaft 32 to define a one-speed version of the on-demand transfer case embodying the present invention.

Referring now primarily to FIG. 2 of the drawings, transfer clutch 50 is shown arranged in association with front output shaft 42 in such a way that it functions to selectively deliver drive torque from a transfer assembly 110 driven by rear output shaft 32 to front output shaft 42 for establishing the four-wheel drive modes. Transfer assembly 110 includes a first sprocket 112 fixed for rotation with rear output shaft 32, a second sprocket 114 rotatably supported on front output shaft 42 and a power chain 118 encircling sprockets 112 and 114. As will be detailed, a hydraulic clutch actuation system 120 is operably associated with mode actuator 52 for use in controlling actuation of transfer clutch 50.

Transfer clutch 50 is shown to include an annular drum 126 coupled for rotation with sprocket 114, a hub 128 fixed for rotation with front output shaft 42 and a multi-plate clutch pack 132 operably disposed between drum 126 and hub 128. Clutch pack 132 includes a set of outer friction plates 134 splined to drum 126 and which are alternatively interleaved with a set of inner friction plates 136 splined to hub 128. A reaction plate 138 is shown fixed for rotation with, and axially restrained on, hub 128. Transfer clutch 50 also includes a pressure plate 146 that is splined for rotation with drum 126 and which is supported for axial sliding movement relative to drum 126. As is known, the position of pressure plate 146 relative to clutch pack 132 controls the amount of drive torque transferred from transfer assembly 110 to front output shaft 42.

Transfer clutch 50 also includes an operator, such as a piston 150, that is supported for movement within a piston chamber 148. Piston 150 is adapted to apply a clutch engagement force on pressure plate 146 which corresponds to the fluid pressure acting on piston 150 within piston chamber 148. In particular, pressure plate 146 is axially moveable relative to clutch pack 132 between a first or "released" position and a second or "locked" position. With pressure plate 146 in its released position, a minimum clutch engagement force is exerted on clutch pack 132 such that virtually no drive torque is transferred from rear output shaft 32 to front output shaft 42, thereby establishing the two-wheel drive mode. In contrast, movement of pressure plate 146 to its locked position causes a maximum clutch engagement force to be applied to clutch pack 132 such that front output shaft 42 is, in effect, coupled for common rotation with rear output shaft 32, thereby establishing the part-time four-wheel drive mode. Accordingly, control of the position of pressure plate 146 between its released and locked positions permits adaptive regulation of the amount of drive torque transferred from rear output shaft 32 to front output shaft 42, thereby establishing the on-demand four-wheel drive mode. Piston 150 and pressure plate 146 can be separated by a thrust bearing assembly to permit relative rotation therebetween.

Figure 3:
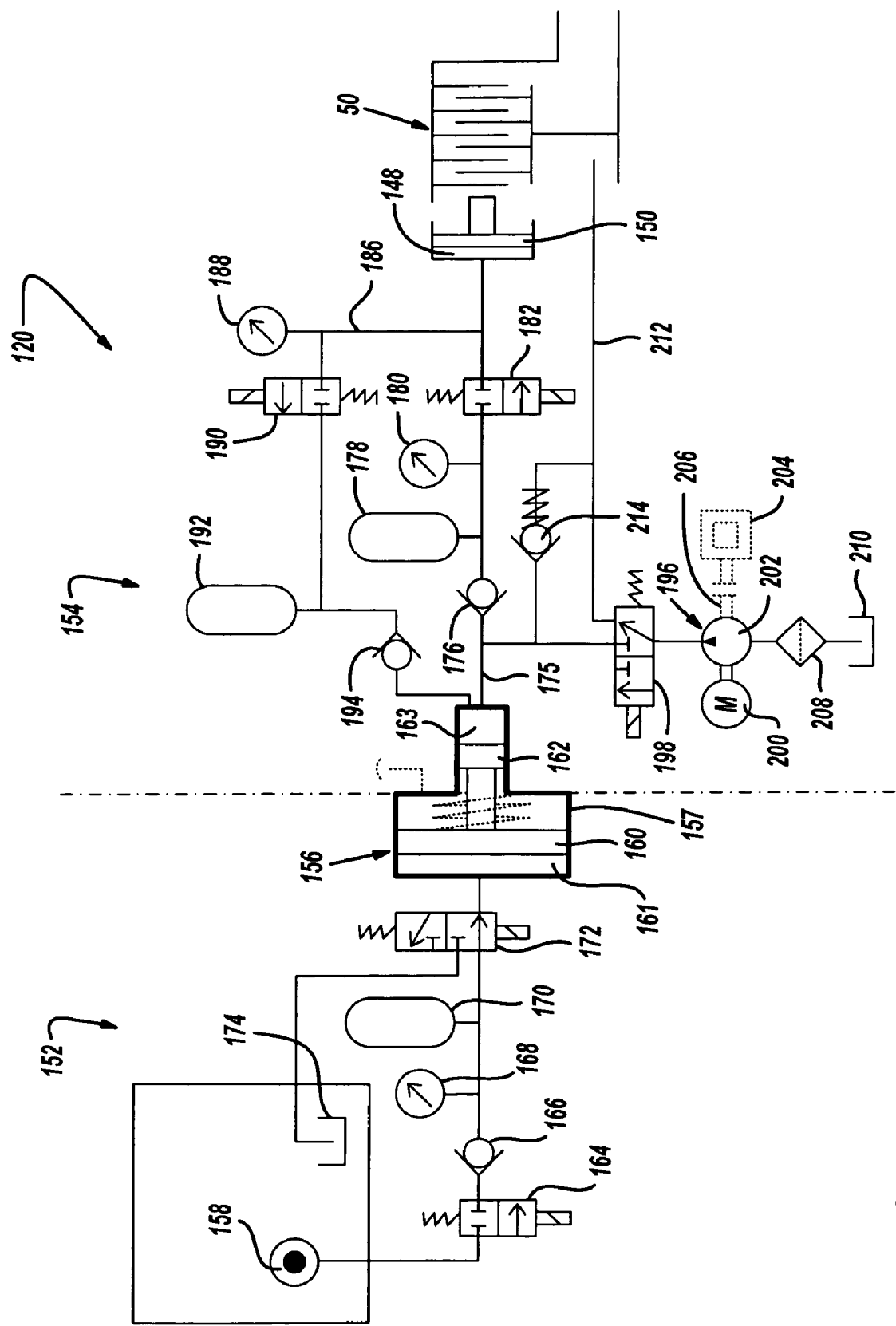
FIG. 3 is a schematic illustration of a hydraulic clutch actuation system according to a first embodiment of the present invention.

With reference to FIG. 3, hydraulic clutch actuation system 120 is shown to include a primary circuit 152 and a secondary circuit 154. Primary circuit 152 controls a first fluid that is maintained at a relatively low pressure of, for example, approximately 20 Bar. As seen, primary circuit 152 is coupled to secondary circuit 154 by a pressure intensifier 156. Pressure intensifier 156 functions to amplify the fluid pressure of a second fluid within secondary circuit 154 to a relatively high fluid pressure of, for example, approximately 200 Bar. The first fluid is supplied to the low pressure side of pressure intensifier 156 by a readily available pressure source 158 located within powertrain 16 such as, for example, an automatic transmission pump or any other powertrain fluid pressure/flow source. In addition, it is contemplated that other pressure sources, such as an independent motor-driven pump, may function as pressure source 158.

Pressure intensifier 156 includes a relatively large diameter low pressure piston 160 that is retained in a low pressure chamber 161 formed in a housing 157. Pressure intensifier 156 also includes a relatively small diameter high pressure piston 162 that is coupled by a spring-biased connector rod to low pressure piston 160. As seen, high pressure piston 162 is retained in a high pressure chamber 163 also formed in housing 157. The fluid pressure within chamber 161 acts on the large surface area of low pressure piston 160 to generate a force that is transferred to high pressure piston 162. Because high pressure piston 162 has significantly less surface area than low pressure piston 160, the fluid pressure within high pressure chamber 163 is greater than the fluid pressure in low pressure chamber 161. Specifically, the pressure in chamber 163 acting on high pressure piston 162 is greater than the pressure in chamber 161 acting on low pressure piston 160 by a ratio corresponding to the effective areas of the pistons. In the example noted, the surface area of low pressure piston 160 is ten times greater than the surface area of high pressure piston 162, thereby producing a 10:1 amplification of the fluid pressure across pressure intensifier 156.

Both primary circuit 152 and secondary circuit 154 each include accumulators, gauges and valves to control the supply and release of pressurized fluid to the various hydraulic elements. By configuring hydraulic clutch actuation system 120 in this manner, the fluids used in primary circuit 152 and secondary circuit 154 are completely separate. Therefore, the hydraulic clutch actuation system of the present invention may be implemented in systems where cleanliness of the fluid is a greater concern within one system than the other. Additionally, secondary circuit 154 may also be controlled to supply pressure to engage or disengage an on-demand lubrication pump to define a high efficiency lubrication system having low power consumption.

With continued reference to FIG. 3, primary circuit 152 is shown to include a first control valve 164, a first check valve 166, a first pressure sensor 168, a first accumulator 170, a second control valve 172 and a sump 174. First control valve 164 controls fluid flow into the primary circuit from existing pressure source 158. First control valve 164 is shown as a spring-biased, solenoid actuated, directional control valve. First control valve 164 is preferably controlled via pulse width modulation. First control valve 164 is one component of a control loop for regulating the pressure in first accumulator 170 as will be described in greater detail hereinafter. First check valve 166 allows flow in the direction from existing pressure source 158 to first accumulator 170 but blocks flow in the reverse direction. First pressure sensor 168 is used to monitor the fluid pressure within first accumulator 170.

Secondary circuit 154 includes a supply line 175 in communication with the fluid within high pressure piston chamber 163. Secondary circuit 154 also includes a second check valve 176, a second accumulator 178, a second pressure sensor 180 and a third control valve 182. Supply line 175 provides highly pressurized fluid to piston chamber 148. As noted, piston 150 is positioned for movement within piston chamber 148 and acts to control the amount of drive torque transferred across transfer clutch 50. A return line 186 includes a third pressure sensor 188, a fourth control valve 190, a third accumulator 192 and a third check valve 194.

A second pressure source 196 is plumbed in communication with a fifth control valve 198. Second pressure source 196 may be provided by an external motor 200 driving a pump 202 or by a gerotor pump 204 that can be selectively coupled to a driven shaft 206 associated with the device being controlled. For example, a gerotor pump driven by rear output shaft 32 of transfer case 22 could be employed. It should be appreciated that gerotor pump 204 may be driven by a mechanical connection or other connections such as electromechanical, electro-hydraulic, electromagnetic and/or another force producing mechanism. A filter 208 is coupled to a sump 210 to provide clean fluid for second pressure source 196. Fifth control valve 198 functions to provide a high flow, low pressure source for a lubrication circuit 212. Lubrication circuit 212 supplies fluid which acts as a coolant to lubricate and cool clutch pack 132 of transfer clutch 50. Fifth control valve 198 may also be actuated to direct pressurized fluid from second pressure source 196 to second accumulator 178 in the event that the primary circuit is disabled or unavailable. A pressure relief valve 214 provides fluid to lubrication circuit 212 after a predetermined pressure is exceeded during pressurization of second accumulator 178.

Pressure source 158 is coupled to first accumulator 170 by actuating first control valve 164 to allow pressurized fluid to pass through first check valve 166 and be monitored by first pressure sensor 168. First pressure sensor 168 and first control valve 164 are in communication with a primary pressure control unit 216 (FIG. 4) to form a closed loop control system for maintaining a desired pressure within first accumulator 170. Second control valve 172 is normally operable for allowing pressure from first accumulator 170 to communicate with low pressure chamber 161 so as to act on low pressure piston 160. However, second control valve 172 may be selectively actuated to interrupt the flow path between first accumulator 170 and low pressure chamber 161 while providing a flow path for fluid in low pressure piston 161 to be returned to reservoir or sump 174.

Primary pressure control unit 216 evaluates information provided from first pressure sensor 168 and pressure source 158 to control proper actuation of first control valve 164. Information regarding pressure source 158 is fed forward to primary pressure control unit 216, as indicated by block 215, and is used to reduce the response time required to maintain the fluid pressure in second accumulator 178 within a desired range. However, it should be appreciated that a closed loop feedback control system may be implemented without departing from the scope of the present invention.

Figure 4:
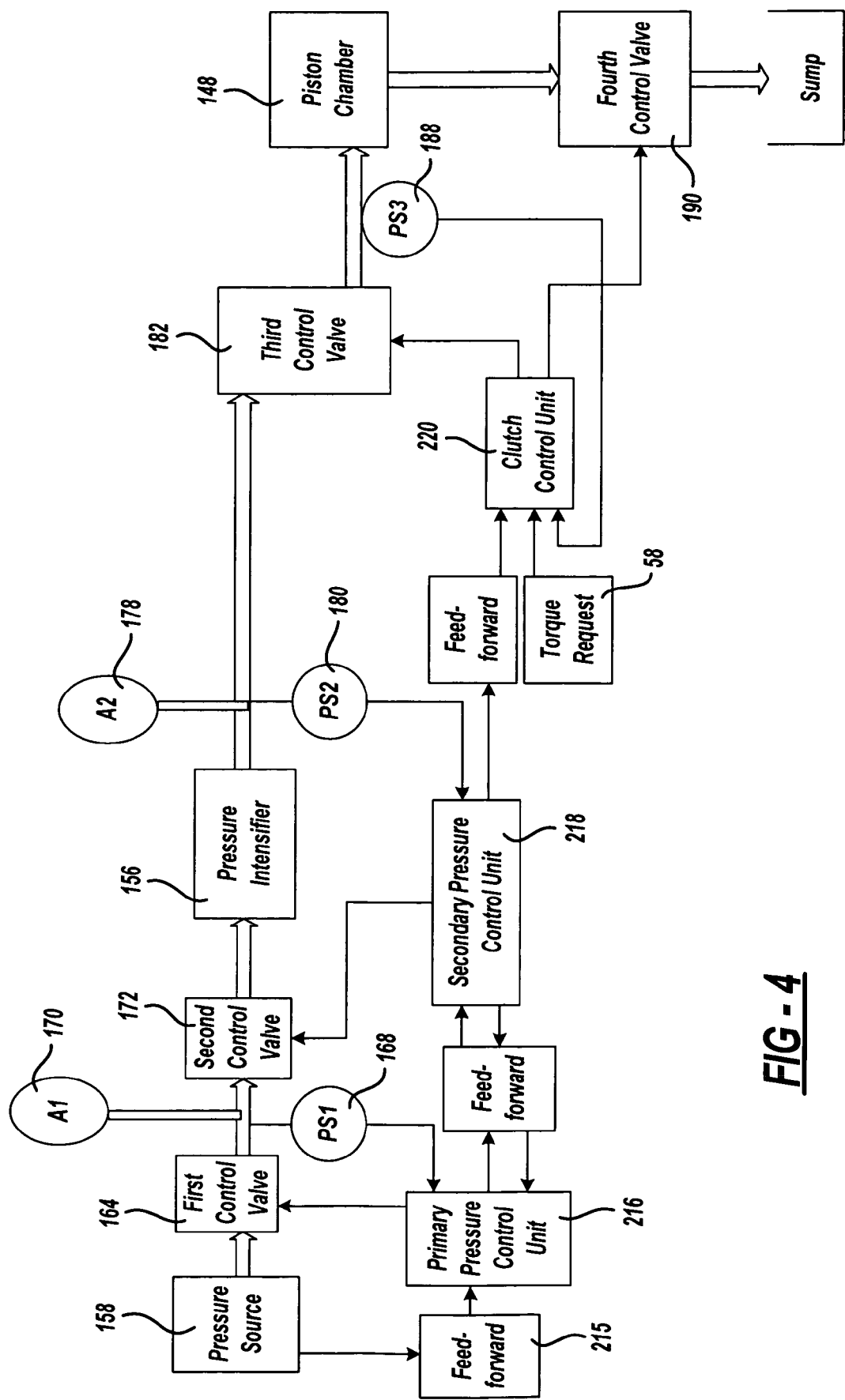
FIG. 4 is a schematic illustration representing a control system for the hydraulic clutch actuation system shown in FIG. 3.

As shown in FIG. 4, primary pressure control unit 216 also obtains information from a secondary pressure control unit 218. Second pressure control unit 218 is in communication with second control valve 172, second pressure sensor 180 and primary pressure control unit 216. As mentioned earlier, primary pressure control unit 216 functions to maintain the fluid pressure within first accumulator 170 within a desired pressure range. Specifically, as the pressure within first accumulator 170 reaches a low limit, first control valve 164 is opened to allow pressure source 158 to increase the pressure within first accumulator 170 until an upper limit of the desired pressure range is reached. At this time, first control valve 164 is closed. Primary pressure control unit 216 also functions to connect pressure source 158 with first accumulator 170 if a pressure drop greater than a predetermined rate occurs at second pressure sensor 180. In this manner, first accumulator 170 is supplied with fluid from pressure source 158 in anticipation of a need for additional pressure in secondary circuit 154.

Secondary pressure control unit 218 functions to maintain a predetermined fluid pressure range within second accumulator 178. Secondary pressure control unit 218 controls selective actuation of second control valve 172 to supply low pressure fluid to low pressure piston 160 in order to drive high pressure piston 162 forward, thereby supplying additional fluid past second check valve 176 into second accumulator 178. This procedure continues until second pressure control unit 218 receives a signal from second pressure sensor 180 that an upper limit of the desired pressure range of second accumulator 178 has been met.

A clutch control unit 220 receives data from second pressure sensor 180, third pressure sensor 188 and controller 58. Upon demand, controller 58 provides a torque request to clutch control unit 220. Based on the magnitude of the torque request, clutch control unit 220 compares the fluid pressure within piston chamber 148 (as indicated by third pressure sensor 188) with the available pressure within second accumulator 178 (as indicated by second pressure sensor 180 If the proper conditions have been met, third control valve 182 is signaled to supply high pressure fluid to piston chamber 148 and actuate transfer clutch 50.

When the vehicle operating conditions indicate that the torque request can be eliminated, third control valve 182 is closed and fourth control valve 190 is opened. As such, pressurized fluid from piston chamber 148 travels through return line 186 to third accumulator 192 which, in turn, acts as a low pressure fluid storage reservoir. Furthermore, third accumulator 192 is arranged to compensate for changes in volume in second accumulator 178. Specifically, third accumulator 192 provides a source of fluid for high pressure chamber 163 of pressure intensifier 156 as piston 162 retracts during the reciprocal pumping action required to pressurize second accumulator 178. Third check valve 194 functions to block the flow of fluid from the highly pressurized portion of pressure intensifier 156 to third accumulator 192 during the process of pressuring second accumulator 178. It should be appreciated that primary circuit 152 acts in conjunction with secondary circuit 154 when a torque demand is discontinued. In addition to opening fourth control valve 190, second control valve 172 is actuated to discontinue the supply of low pressure fluid from first accumulator 170. Thus, the fluid in low pressure chamber 161 is allowed to pass through second control valve 172 and drain back to sump 174.

In the event that primary circuit 152 has become disabled, second pressure source 196 is coupled to second accumulator 178 by actuating fifth control valve 198. Preferably, second pressure source 196 is configured as positive displacement pump 202 driven by motor 200. As will be described in greater detail hereinafter, gerotor 204 may be coupled to driven shaft 206 to provide efficient pumping of fluid to lubrication path 212 or second accumulator 178.

Figure 5:
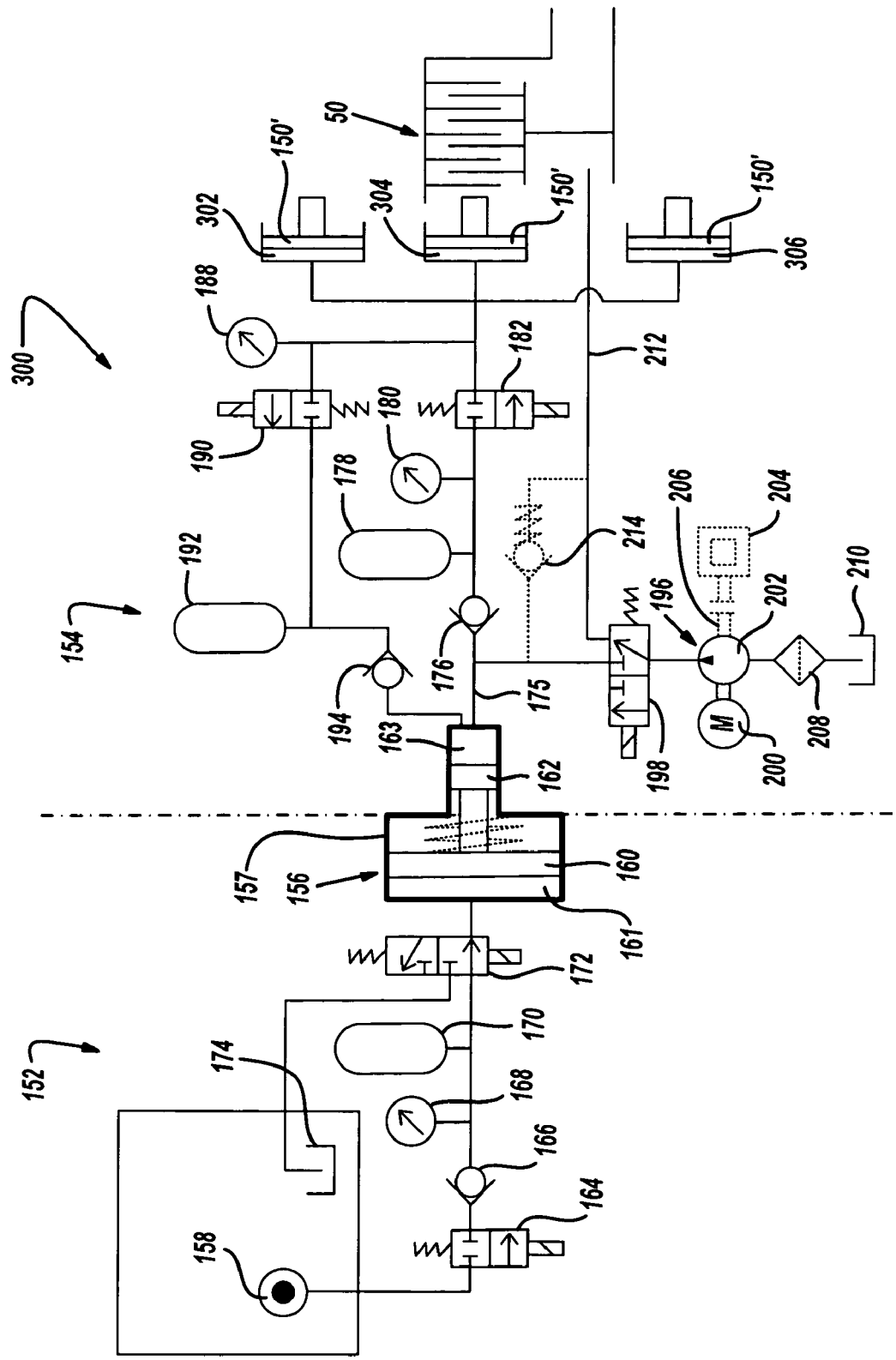
FIG. 5 is a schematic illustration of a hydraulic clutch actuation system according to an alternative embodiment of the present invention.

FIG. 5 depicts an alternate hydraulic clutch actuation system 300. Since hydraulic clutch actuation system 300 is substantially similar to hydraulic clutch actuation system 120, like elements will be identified with the reference numerals previously presented. Hydraulic clutch actuation system 300 includes a plurality of piston chambers 302, 304 and 306, each of which is in fluid communication with third control valve 182. Piston chambers 302, 304 and 306 are preferably circumferentially spaced apart from one another and each supports a piston 150' for movement therein. The pressure in the piston chambers act on the pistons 150' which, in turn, apply a clutch engagement force to pressure plate 146 of transfer clutch 50. Alternatively, piston chambers 302, 304 and 306 may be used to concurrently actuate a number of clutches and/or brakes using the same control signal from third control valve 182.

Figure 6:
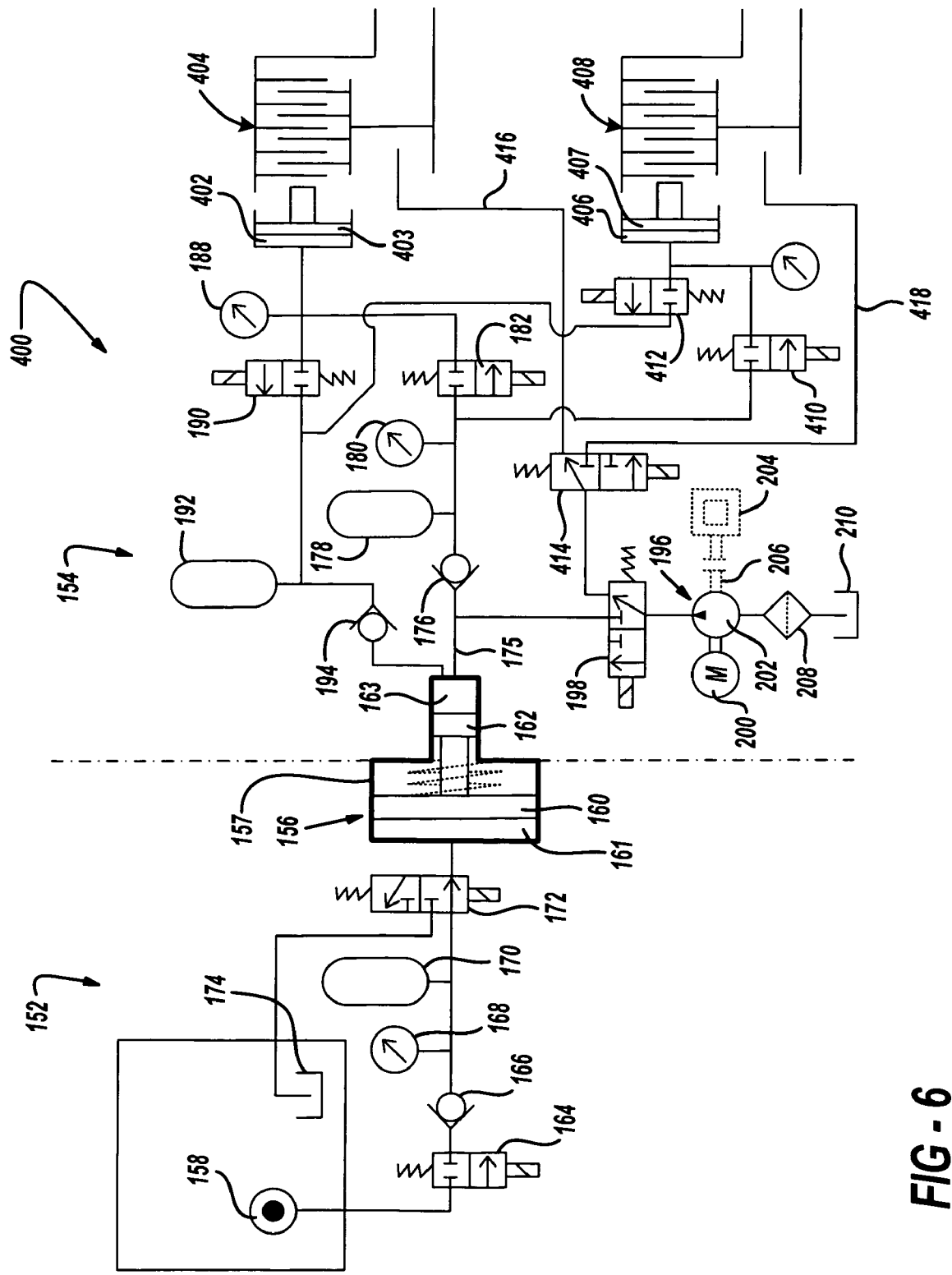
FIG. 6 is a schematic illustration of a hydraulic clutch actuation system according to another alternative embodiment of the present invention having multiple individually controllable clutches.

FIG. 6 presents another alternate hydraulic clutch actuation system 400. In many respects, hydraulic clutch actuation system 400 is similar to the clutch actuation systems previously described. Accordingly, like elements will again be identified with their previously introduced reference numerals. The primary distinction, however, is that hydraulic clutch actuation system 400 permits independent control of two or more devices using a common primary circuit 152 and a single pressure intensifier 156. In this regard, hydraulic clutch actuation system 400 includes a first piston chamber 402 having a first piston 403 operable for controlling actuation of a first clutch 404 and a second piston chamber 406 having a second piston 407 operable for controlling actuation of a second clutch 408. Control of the fluid pressure within chamber 402 of clutch 404 is substantially similar to that described above for controlling the fluid pressure in chamber 148 of clutch 50. However, the fluid pressure within second piston chamber 406 can be controlled independently of the fluid pressure within first piston chamber 402. This is accomplished by adding a sixth control valve 410 that is operable to supply highly pressurized fluid from second accumulator 178 to second piston chamber 406. In addition, a seventh control valve 412 can be selectively actuated to relieve pressure from second piston chamber 406 and supply fluid to third accumulator 192. Finally, an eighth control valve 414 interconnects a first lubrication pipeline 416 to first clutch 404 as well as a second lubrication pipeline 418 to second clutch 408. Eighth control valve 414 may be actuated to selectively cool and lubricate first clutch 404 or second clutch 408 as required. Alternatively, eighth control valve 414 may be configured to supply each clutch with lubricating fluid.

Hydraulic clutch actuation system 400 offers the benefit of permitting independent actuation of two or more devices within the motor vehicle driveline utilizing a remotely located primary circuit 152 and pressure intensifier 156. As such, a plurality of secondary circuits can be connected to the output of pressure intensifier 156. Each secondary circuit will control actuation of one or more devices (i.e., friction clutch, shift clutch, brake, etc.) in different power transfer units located with the driveline. These power transfer units can include, without limitation, transfer cases, in-line couplings, limited slip axle differentials, power take-off units, automatic transmission, automated-shift synchromesh transmissions and the like. In addition, the hydraulic pressure generated and controlled in each secondary circuit can be used to control movement of clutch operator components other than pistons such as, for example, ball ramps, roller ramps, pivotal levers, linkages and the like.

Figure 7:
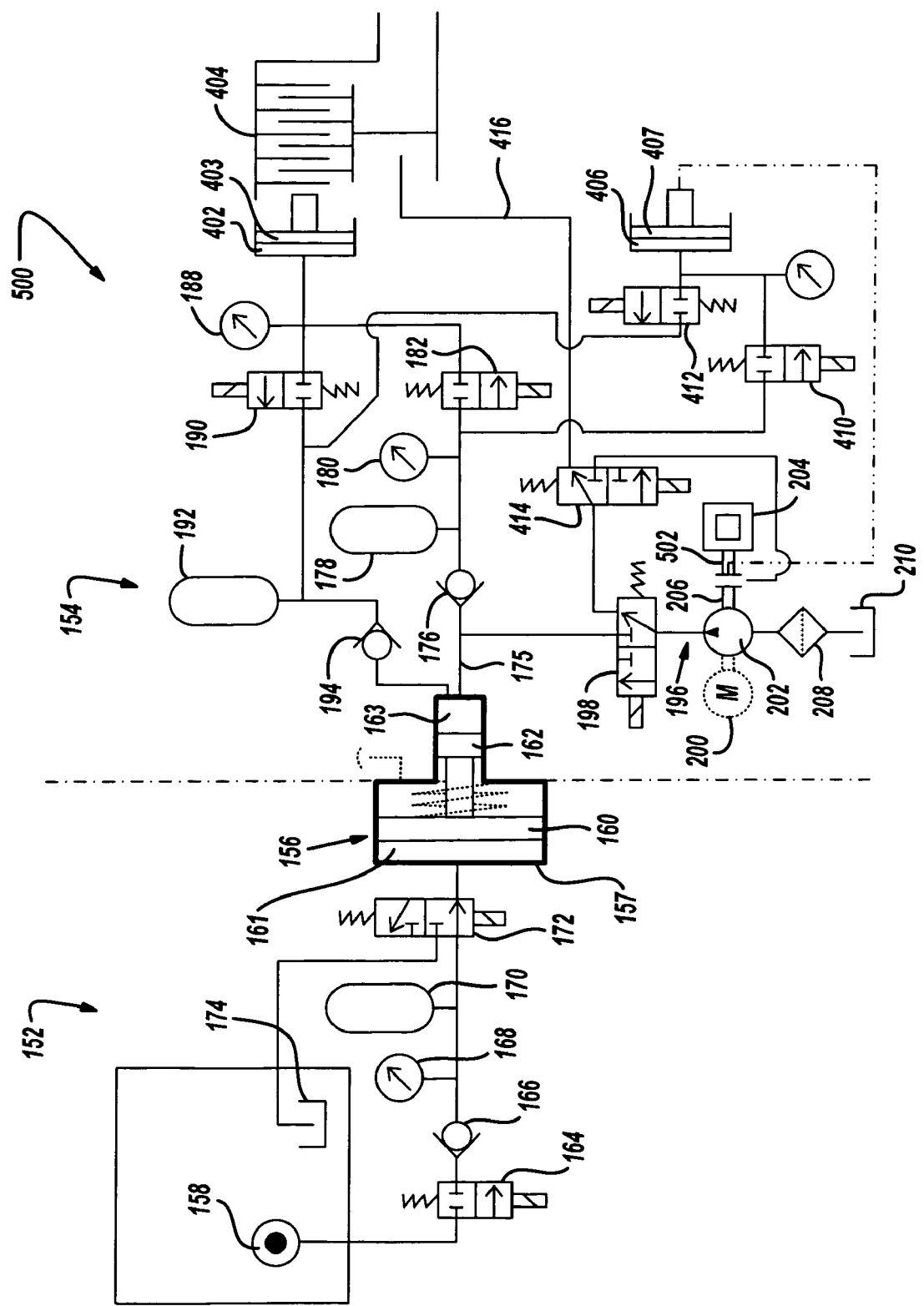
FIG. 7 is a schematic illustration of another alternate embodiment of a hydraulic clutch actuation system which includes a lubrication pump actuation subsystem.

FIG. 7 is a schematic representation of another alternate embodiment hydraulic clutch actuation system 500. Hydraulic clutch actuation system 500 is substantially similar to hydraulic clutch actuation system 400. Accordingly, like elements will retain their previously introduced reference numerals. Hydraulic clutch actuation system 500 includes second piston chamber 406 coupled via a fluid circuit to an inner rotor 502 of gerotor 204. Hydraulic clutch actuation system 500 allows more efficient operation of the power transmission device by not requiring continuous pumping of lubrication to transfer clutch 50. To achieve this goal, motor 200 is not continuously powered during operation. Similarly, inner rotor 502 is not continuously driven, but is only selectively coupled to driven shaft 206. When controller 58 anticipates a need for on-demand clutch actuation, sixth control valve 410 is shifted to provide high pressure fluid from second accumulator 178 to second piston chamber 406. At this time, inner rotor 502 is coupled for rotation with driven shaft 206. Because driven shaft 206 rotates continuously during operation of the power transmission device, pumping of fluid from second pressure source 196 is efficiently achieved.

Pressurized fluid is supplied from second pressure source 196 through fifth control valve 198 and eighth control valve 414 as a lubricant/coolant to transfer clutch 50. Fifth control valve 198 and eighth control valve 414 are normally positioned to provide the lubrication path described. The energy required to lock inner rotor 502 to driven shaft 206 is minimal. It should be appreciated that inner rotor 502 may be coupled to a variety of rotating shafts within the device containing hydraulic clutch actuation system 500. As mentioned, a mainshaft of a transmission or a transfer case may be used. Also, belt driven devices, a pinion shaft or other rotating member may provide the energy required to pump fluid from pressure source 196.

Once inner rotor 502 has been coupled to driven shaft 206 and transfer clutch 50 is fully engaged, seventh control valve 412 and sixth control valve 410 are closed to maintain pressure acting on second piston chamber 406. Fifth control valve 198 is then shifted to provide flow from second pressure source to second accumulator 178. By operating hydraulic clutch actuation system 500 in this manner, electrical current draw from motor 200 is greatly reduced.

Returning to a more global view of power transfer system operation as depicted in FIGS. 1 and 2, when mode select mechanism 56 indicates selection of the two-wheel high-range drive mode, range actuator 48 is signaled to move range sleeve 88 to its H position and transfer clutch 50 is maintained in a released condition and no torque requirement signal is sent to clutch control unit 220, whereby all drive torque is delivered to rear output shaft 32. If mode select mechanism 56 thereafter indicates selection of a part-time four-wheel high-range mode, range sleeve 88 is maintained in its H position and an electrical control signal is sent by controller 58 to clutch control unit 220 to force piston 150 to move pressure plate 146 axially from a disengaged position until a maximum clutch engagement force is delivered to clutch pack 132 for effectively coupling hub 128 for common rotation with drum 126.

If a part-time four-wheel low-range drive mode is selected, the operation of transfer clutch 50 identical to that described above for the part-time high-range drive mode. However, in this mode, range actuator 48 is signaled to locate range sleeve 88 in its L position to establish the low-range drive connection between input shaft 46 and rear output shaft 32. It is contemplated that hydraulic clutch actuation system 400 of FIG. 6 could be used to control independent actuation of range actuator 48 and transfer clutch 50.

When the mode signal indicates selection of the on-demand four-wheel high-range drive mode, range actuator 48 moves or maintains range sleeve 88 in its H position and hydraulic clutch actuation system 120 is placed in a ready or "stand-by" condition. Specifically, the minimum amount of drive torque sent to front output shaft 42 through transfer clutch 50 in the stand-by condition can be zero or a slight amount (i.e., in the range of 2-10%) as required for the certain vehicular application. This minimum stand-by torque transfer is generated by controller 58 sending a control signal having a predetermined minimum torque request to clutch control unit 220. Thereafter, controller 58 determines when and how much drive torque needs to be transferred to front output shaft 42 based on tractive conditions and/or vehicle operating characteristics detected by vehicle sensors 54. For example, a first speed sensor 251 (FIG. 2) sends a signal to controller 58 indicative of the rotary speed of rear output shaft 32 while a second speed sensor 253 sends a signal indicative of the rotary speed of front output shaft 42. Controller 58 can vary the magnitude of the electrical signal sent to hydraulic clutch actuation system 120 between the predetermined minimum value and a predetermined maximum value based on defined relationships such as, for example, the speed difference between output shafts 32 and 42.

While transfer clutch 50 is shown arranged on front output shaft 42, it is evident that it could easily be installed on rear output shaft 32 for transferring drive torque to a transfer assembly arranged to drive front output shaft 42. Likewise, the present invention can be used as an in-line torque transfer coupling in an all wheel drive vehicle to selectively and/or automatically transfer drive torque on-demand from the primary (i.e., front) driveline to the secondary (i.e., rear) driveline. Likewise, in full-time transfer cases equipped with an interaxle differential, transfer clutch 50 could be used to limit slip and bias torque across the differential.

Figure 8:
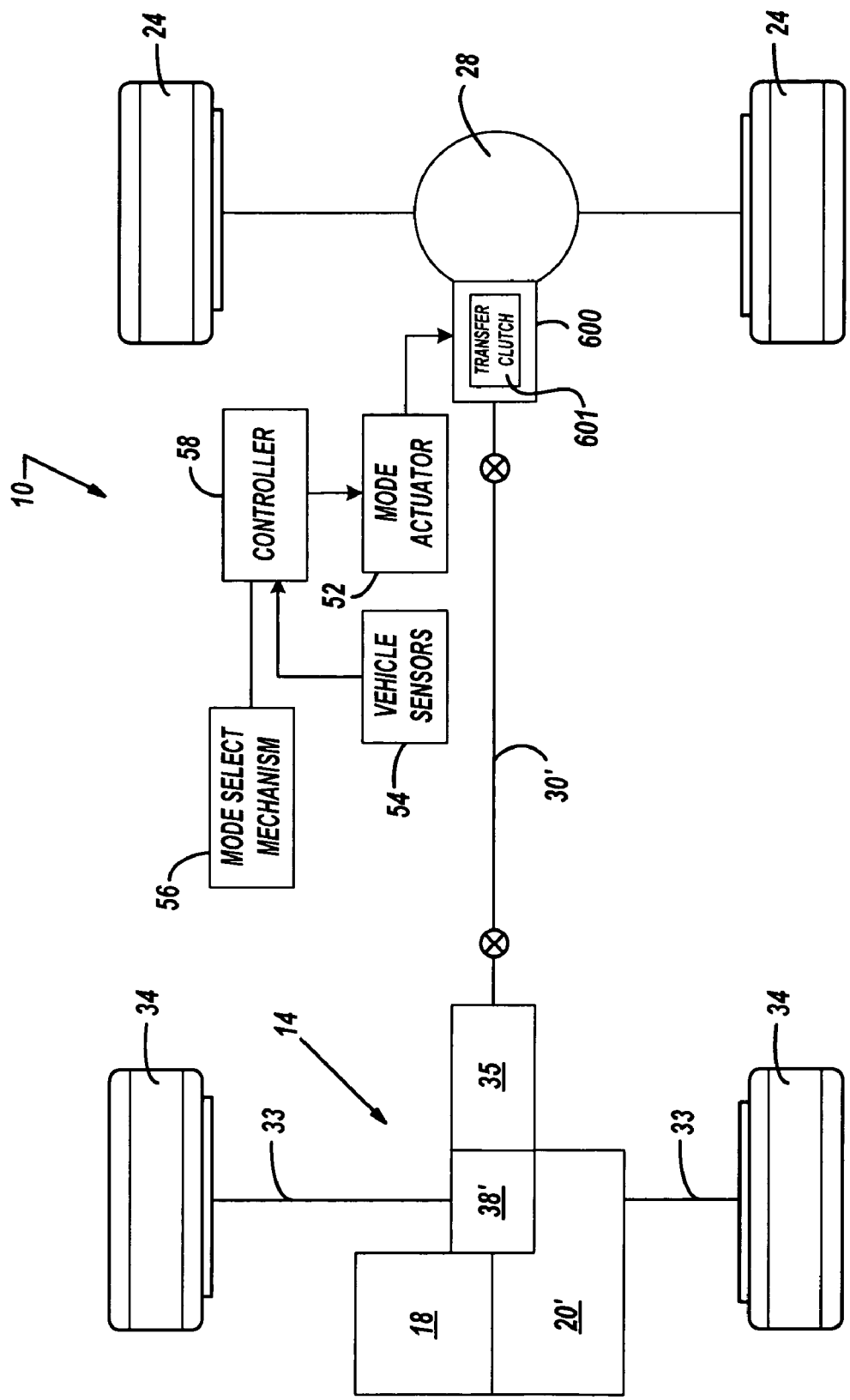
FIG. 8 illustrates an alternative drivetrain for a four-wheel drive vehicle equipped with a power transmission device of the present invention.

To illustrate another alternative power transmission device to which the present invention is applicable, FIG. 8 schematically depicts a front-wheel based four-wheel drive layout. In particular, engine 18 drives a multi-speed transmission 20' having an integrated front differential unit 38' for driving front wheels 34 via axle shafts 33. A transfer unit 35 is also driven by transmission 20' for delivering drive torque to the input member of an in-line torque transfer coupling 600 via a drive shaft 30'. In particular, the input member of transfer coupling 600 is coupled to drive shaft 30' while its output member is coupled to a drive component of rear differential 28. Accordingly, when sensors indicate the occurrence of a front wheel slip condition, controller 58 adaptively controls actuation of torque coupling 600 such that drive torque is delivered "on-demand" to rear wheels 24. It is contemplated that torque transfer coupling 600 would include a transfer clutch 601 generally similar in structure and function to that of any of the transfer clutch devices previously described herein.

Figure 9:
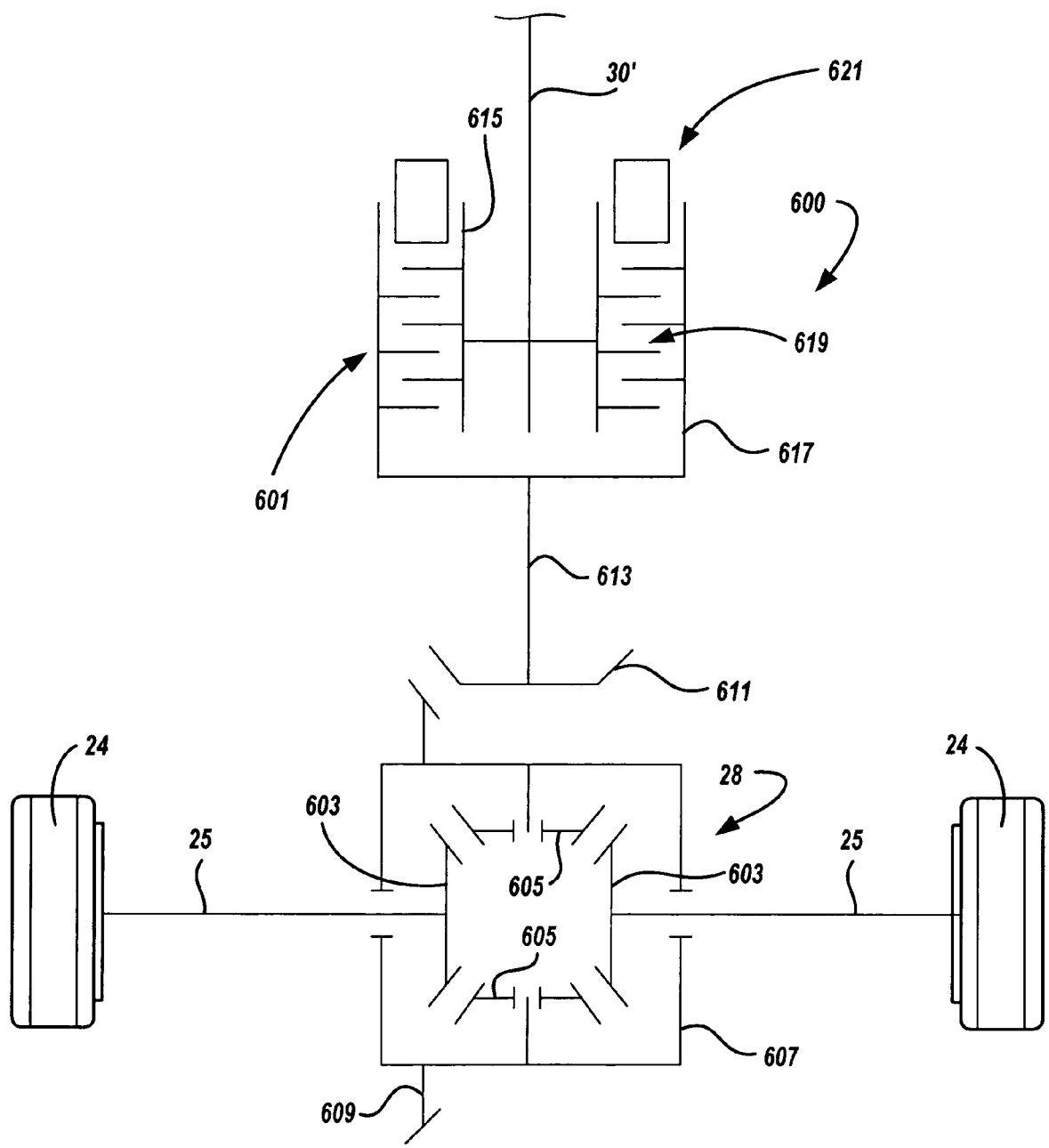
FIG. 9 is a schematic illustration of a rear drive module associated with the four-wheel drive vehicle shown in FIG. 8.

Referring to FIG. 9, torque coupling 600 is schematically illustrated operably disposed between drive shaft 30' and rear differential 28. Rear differential 28 includes a pair of side gears 603 that are connected to rear wheels 24 via rear axle shafts 25. Differential 28 also includes pinions 605 that are rotatably supported on pinion shafts fixed to a carrier 607 and which mesh with side gears 605. A right-angled drive mechanism is also associated with rear differential 28 and includes a ring gear 609 fixed for rotation with carrier 607 and a pinion gear 611 meshed with ring gear 609. Pinion gear 613 is shown to be fixed for rotation with a pinion shaft 613.

Torque coupling 600 includes a mutli-plate clutch assembly 601 operably disposed between driveshaft 30' and pinion shaft 613 and which includes a hub 615 fixed for rotation with driveshaft 30', a drum 617 fixed for rotation with pinion shaft 613 and a clutch pack 619. Torque coupling 600 also includes a hydraulic clutch actuator system 621 for controlling the magnitude of the clutch engagement force applied to clutch assembly 601 and thus the amount of drive torque transferred from drive shaft 30' to rear differential 28. Preferably, clutch actuation system 621 is substantially similar to one of clutch actuation systems 120 and 300 previously disclosed.

Torque coupling 600 permits operation in any of the drive modes previously disclosed. For example, if the on-demand 4WD mode is selected, controller 58 regulates activation of mode actuator 621 in response to the operating conditions detected by sensors 54. Selection of the part-time 4WD mode results in complete engagement of clutch pack 619 such that pinion shaft 613 is, in effect, rigidly coupled to driveshaft 30'. Finally, in the two-wheel drive mode, clutch pack 619 is released such that pinion shaft 613 is free to rotate relative to driveshaft 30'. Alternatively, elimination of mode select mechanism 56 would provide automatic on-demand operation of torque coupling 600 in a manner completely transparent to the vehicle operator.

Figure 10:
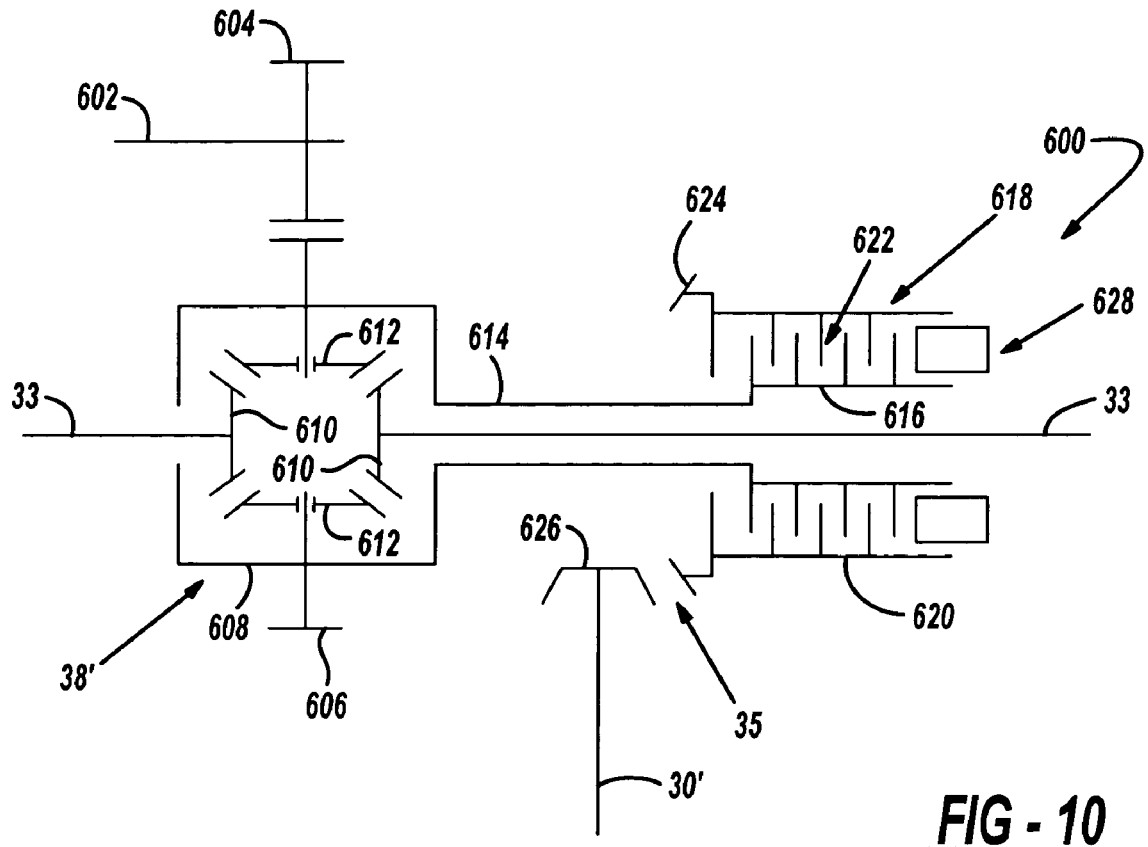
FIGS. 10 through 14 are schematic illustrations of alternative embodiments of power transmission devices according to the present invention.

Referring now to FIG. 10, torque coupling 600 is now schematically illustrated in association with an on-demand four-wheel drive system based on a front-wheel drive vehicle similar to that shown in FIG. 8 except that torque coupling 600 is positioned to transfer torque from transfer unit 35 to drive shaft 30'. In particular, an output shaft 602 of transmission 20' is shown to drive an output gear 604 which, in turn, drives an input gear 606 fixed to a carrier 608 associated with front differential unit 38'. To provide drive torque to front wheels 34, front differential unit 38' includes a pair of side gears 610 that are connected to front wheels 34 via axleshafts 33. Differential unit 38' also includes pinions 612 that are rotatably supported on pinion shafts fixed to carrier 608 and which are meshed with side gears 610. A transfer shaft 614 is provided to transfer drive torque from carrier 608 to a clutch hub 616 associated with a multi-pate clutch assembly 618. Clutch assembly 618 further includes a drum 620 and a clutch pack 622 having interleaved clutch plates operably connected between hub 616 and drum 620.

Transfer unit 35 is a right-angled drive mechanism including a ring gear 624 fixed for rotation with drum 620 of clutch assembly 618 which is meshed with a pinion gear 626 fixed for rotation with drive shaft 30'. As seen, a hydraulic clutch actuation system 628 is schematically illustrated for controlling actuation of clutch assembly 618. According to the present invention, hydraulic clutch actuation system 628 is similar to any one of the various hydraulic clutch actuation systems previously described in that a first circuit provides low pressure fluid to a pressure intensifier which supplies a piston for engaging clutch pack 622.

In operation, drive torque is transferred from the primary (i.e., front) driveline to the secondary (i.e., rear) driveline in accordance with the particular mode selected by the vehicle operator via mode selector 56. For example, if the on-demand 4WD mode is selected, controller 58 modulates actuation of hydraulic clutch actuation system 628 in response to the vehicle operating conditions detected by sensors 54 by varying the value of the electric control signal sent to the control unit 220. In this manner, the level of clutch engagement and the amount of drive torque that is transferred through clutch pack 622 to the rear driveline through transfer unit 35 and drive shaft 30' is adaptively controlled. Selection of a locked or part-time 4WD mode results in full engagement of clutch assembly 618 for rigidly coupling the front driveline to the rear driveline. In some applications, the mode selector 56 may be eliminated such that only the on-demand 4WD mode is available so as to continuously provide adaptive traction control without input from the vehicle operator.

Figure 11:
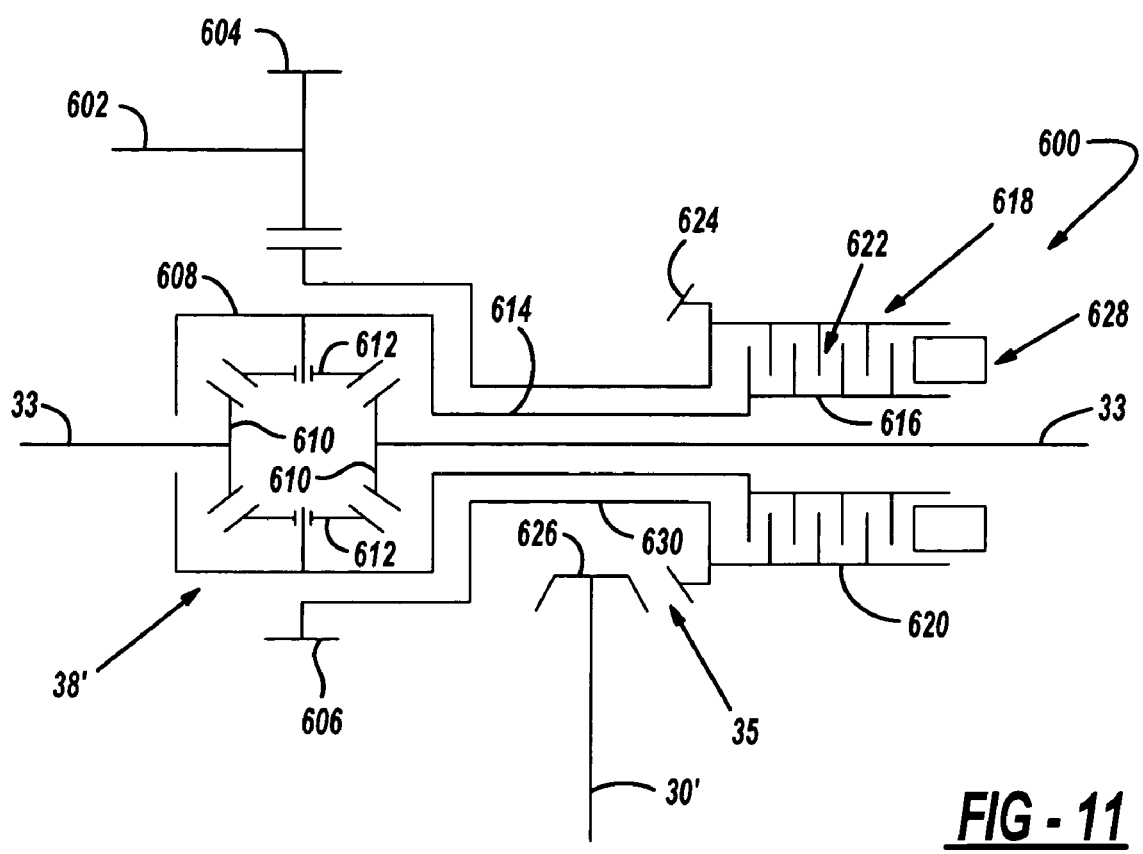

FIG. 11 illustrates a modified version of FIG. 10 wherein an on-demand four-wheel drive system based on a rear-wheel drive motor vehicle that is arranged to normally deliver drive torque to rear wheels 24 while selectively transmitting drive torque to front wheels 34 through torque coupling 600. In this arrangement, drive torque is transmitted directly from transmission output shaft 602 to transfer unit 35 via a drive shaft 630 interconnecting input gear 606 to ring gear 624. To provide drive torque to front wheels 34, torque coupling 600 is now shown operably disposed between drive shaft 630 and transfer shaft 614. In particular, clutch assembly 618 is arranged such that drum 620 is driven with ring gear 624 by drive shaft 630. As such, actuation of torque coupling 600 functions to transfer torque from drum 620 through clutch pack 622 to hub 616 which, in turn, drives carrier 608 of front differential unit 38' via transfer shaft 614.

Figure 12:
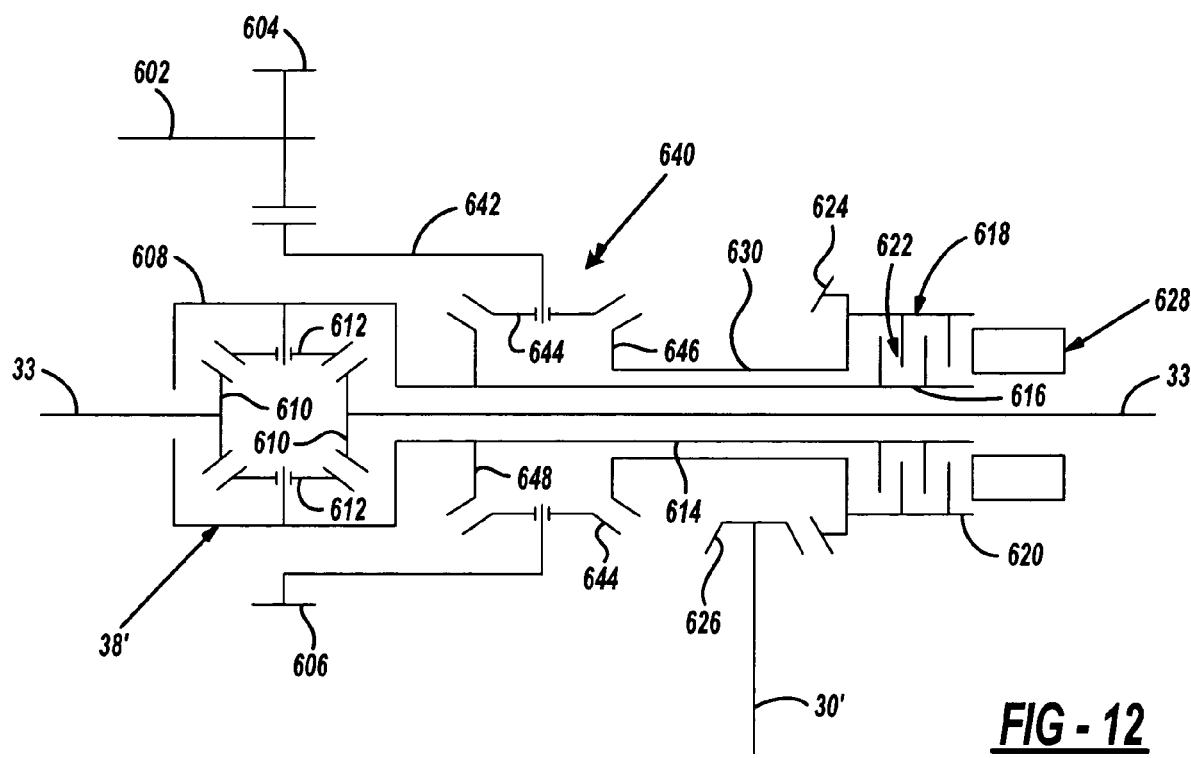

In addition to the on-demand 4WD systems shown previously, the power transmission (clutch actuator and clutch assembly) technology of the present invention can likewise be used in full-time 4WD systems to adaptively bias the torque distribution transmitted by a center or "interaxle" differential unit to the front and rear drivelines. For example, FIG. 12 schematically illustrates a full-time four-wheel drive system which is generally similar to the on-demand four-wheel drive system shown in FIG. 11 with the exception that an interaxle differential unit 640 is now operably installed between carrier 608 of front differential unit 38' and transfer shaft 614. In particular, input gear 606 is fixed for rotation with a carrier 642 of interaxle differential 640 from which pinion gears 644 are rotatably supported. A first side gear 646 is meshed with pinion gears 644 and is fixed for rotation with drive shaft 630 so as to be drivingly interconnected to the rear driveline through transfer unit 35. Likewise, a second side gear 648 is meshed with pinion gears 644 and is fixed for rotation with carrier 608 of front differential unit 38' so as to be drivingly interconnected to the front driveline. In operation, when sensor 54 detects a vehicle operating condition, such as excessive interaxle slip, controller 58 adaptively controls activation of the piston associated with hydraulic clutch actuation system 628 for controlling engagement of clutch assembly 618 and thus the torque biasing between the front and rear driveline.

Figure 13:
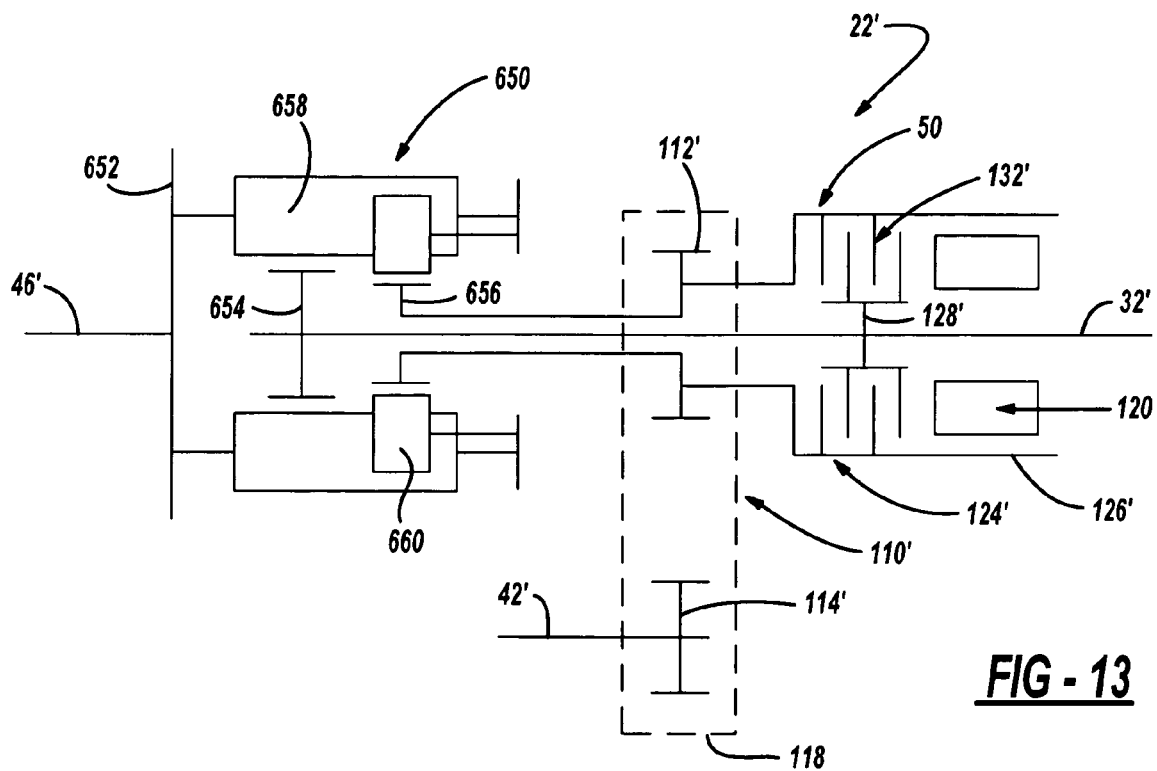

Referring now to FIG. 13, a full-time 4WD system is shown to include a transfer case 22' equipped with an interaxle differential 650 between an input shaft 46' and output shafts 32' and 42'. Differential 650 includes an input defined as a planet carrier 652, a first output defined as a first sun gear 654, a second output defined as a second sun gear 656, and a gearset for permitting speed differentiation between first and second sun gears 654 and 656. The gearset includes meshed pairs of first planet gears 658 and second pinions 660 which are rotatably supported by carrier 652. First planet gears 658 are shown to mesh with first sun gear 654 while second pinions 660 are meshed with second sun gear 656. First sun gear 654 is fixed for rotation with rear output shaft 32' so as to transmit drive torque to rear driveline 12. To transmit drive torque to front driveline 14, second sun gear 656 is coupled to a transfer assembly 110' which includes a first sprocket 112' rotatably supported on rear output shaft 32', a second sprocket 114' fixed to front output shaft 42' and a power chain 118.

Transfer case 22' further includes a transfer clutch 50 and hydraulic clutch actuation system 120. Transfer clutch 50 includes a drum 126' fixed for rotation with first sprocket 112', a hub 128' fixed for rotation with rear output shaft 32', and a multi-plate clutch pack 132' operably disposed therebetween. Hydraulic clutch actuation system 120' includes a piston that can be hydraulically engaged with clutch pack 132'.

Figure 14:
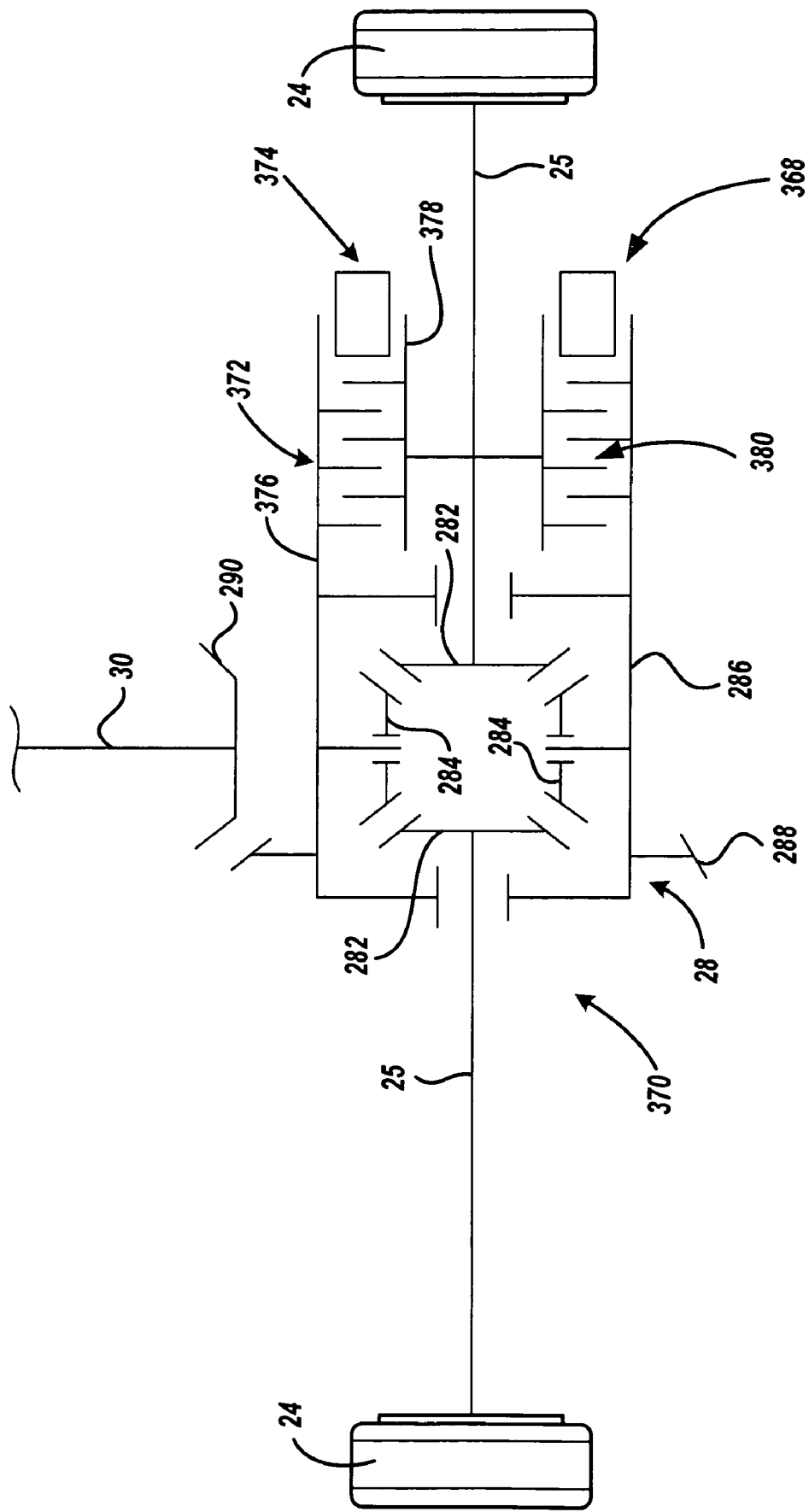

Referring now to FIG. 14, a drive axle assembly 370 is shown which is generally a modified version of rear axle assembly 26 and which incorporates a torque transfer mechanism in association with rear differential 28 so as to permit adaptive control of the torque biasing and intra-axle speed differentiation between rear wheels 24. The torque transfer mechanism is a torque bias coupling 368 shown to include a multi-plate clutch assembly 372 that is operably disposed between carrier 286 and one of axleshafts 25 and a clutch actuator system 374. Clutch assembly 372 includes a drum 376 fixed for rotation with carrier 286, a hub 378 fixed for rotation with one of axleshafts 25 and a clutch pack 380 disposed therebetween. Clutch actuator system 374 is operable for controlling the magnitude of a clutch engagement force applied to clutch pack 380 and thus, the torque biasing between the left and right wheels 24. Clutch actuator system 374 is similar to the clutch actuator systems previously described.

Drive axle assembly 370 can be used alone or in combination with other torque transfer mechanisms disclosed herein. In particular, drive axle assembly 370 can be associated with the primary axle in a rear wheel based on-demand 4WD drivetrain, a front wheel based on-demand 4WD drivetrain or in either (or both) axles in full-time 4WD drivetrains.

Preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device, comprising:
   first and second rotary members;
   a clutch disposed between said first and second members;
   a clutch operator moveable between a first position whereat said clutch is released and a second position whereat said clutch is engaged; and
   a hydraulic clutch actuation system operable for moving said clutch operator between its first and second positions and including a pressure intensifier, a primary fluid circuit supplying a first fluid to a low pressure inlet of said pressure intensifier, a secondary fluid circuit supplying a second fluid from a high pressure outlet of said pressure intensifier to said clutch operator, a control valve associated with one of said primary and secondary fluid circuits and a control unit for controlling actuation of said control valve.

2. The power transmission device of claim 1 wherein said primary fluid circuit includes a pressure source for supplying said first fluid to said control valve, and wherein said control valve is operable to control the fluid pressure supplied from said pressure source to said inlet of said pressure intensifier.

3. The power transmission device of claim 2 wherein said secondary fluid circuit includes a second control valve actuated by said control unit for regulating the fluid pressure supplied from said outlet of said pressure intensifier to said clutch operator for controlling movement of said clutch operator between its first and second positions.

4. The power transmission device of claim 3 wherein said secondary fluid circuit further includes a second pressure source and a third control valve actuated by said control unit for varying the fluid pressure supplied to said second control valve.

5. The power transmission device of claim 1 defining a transfer case for a four-wheel drive vehicle such that said first rotary member drives a first driveline and said second rotary member drives a second driveline.

6. The power transmission device of claim 1 wherein said first rotary member is driven by a powertrain of a motor vehicle and said second rotary member drives a differential of an axle assembly.

7. The power transmission device of claim 1 wherein said first and second rotary members are first and second axleshafts of an axle assembly with said clutch operably arranged to limit slip therebetween.

8. A power transmission device comprising:
   a first rotary member;
   a second rotary member;
   a torque transfer mechanism operable for transferring drive torque between said first and second rotary members, said torque transfer mechanism including a clutch assembly operably disposed between said first and second rotary members and a hydraulic clutch actuation system, said hydraulic clutch actuation system including a pressure intensifier, a primary fluid circuit and a secondary fluid circuit, said primary fluid circuit having a pressure source for supplying a first fluid to said pressure intensifier, said secondary fluid circuit supplying a second fluid from said pressure intensifier to a pressure chamber for causing a clutch operator to engage said clutch assembly; and
   a control unit for controlling actuation of a first control valve in said primary fluid circuit and a second control valve in said secondary fluid circuit for regulating the fluid pressure supplied to said pressure chamber.

9. The power transmission of claim 8 wherein said primary circuit further includes an accumulator and a third control valve disposed in a flow path between said pressure source and said first control valve for regulating the fluid pressure in said accumulator.

10. A power transmission device for use in a motor vehicle having a powertrain and first and second drivelines, comprising:
    a first shaft driven by the powertrain and adapted for connection to the first driveline;
    a second shaft adapted for connection to the second driveline;
    a mode clutch operably disposed between said first and second shafts; and
    a hydraulic clutch actuation system operable for controlling engagement of said mode clutch, said hydraulic clutch actuation system including a fluid pressure source for supplying a first fluid to a pressure intensifier, said pressure intensifier operable for supplying a second fluid at a greater fluid pressure to a moveable clutch operator to release and engage said mode clutch.

11. The power transmission device of claim 10 wherein said pressure source supplies said first fluid to a control valve, and wherein said control valve is operable to control the fluid pressure supplied from said pressure source to said pressure intensifier.

12. The power transmission device of claim 11 wherein said hydraulic clutch actuation system includes a second control valve operable for regulating the fluid pressure supplied from said pressure intensifier to said clutch operator for controlling movement of said clutch operator between its first and second positions.

13. The power transmission device of claim 12 wherein said hydraulic clutch actuation system further includes a second pressure source and a third control valve operable for varying the fluid pressure supplied to said second control valve.

14. A power transmission device comprising:
    a rotary input member adapted to receive drive torque from a source of torque;
    a rotary output member adapted to provide drive torque to an output device;
    a friction clutch operable for transferring drive torque from said input member to said output member; and
    a hydraulic clutch actuation system operable for selectively engaging said friction clutch, said hydraulic clutch actuation system including a primary fluid circuit and a secondary fluid circuit interconnected by a pressure intensifier, said secondary fluid circuit is operable in a first mode to engage said friction clutch and a second mode to release said friction clutch.

15. The power transmission device of claim 14 wherein said primary fluid circuit is operable in an apply mode and a release mode and includes a pressure source in communication with a low pressure side of said pressure intensifier in said apply mode, said low pressure side of said pressure intensifier being in communication with a sump in said release mode.

16. The power transmission device of claim 15 wherein said secondary fluid circuit includes a supply line selectively coupling a high pressure side of said pressure intensifier to a piston operable for engaging said friction clutch.

17. The power transmission device of claim 16 wherein said secondary fluid circuit includes an accumulator for storing pressurized fluid generated when said primary fluid circuit is in said apply mode.

18. The power transmission device of claim 16 wherein said secondary fluid circuit includes a return line selectively coupling said piston to a low pressure reservoir to allow release of said friction clutch.

19. A transfer case comprising:
an input shaft driven by a source of drive torque;
a gearset having a first component driven by said input shaft and a second component driven at a reduced speed relative to said input shaft;
a first output shaft adapted to provide drive torque to a first driveline;
a second output shaft adapted to provide drive torque to a second driveline;
a range clutch having a range operator moveable between a first position and a second position for coupling said first output shaft for rotation with one of said input shaft and said second component of said gearset; and
a hydraulic clutch actuation system for controlling actuation of said range clutch, said hydraulic clutch actuation system including a primary fluid circuit providing low pressure fluid to an inlet of a pressure intensifier, a secondary fluid circuit providing high pressure fluid from an outlet of said pressure intensifier to said range operator, and a control valve for controlling the supply of said high pressure fluid to said range operator.

20. The transfer case of claim 19 further including a mode clutch having a mode operator moveable between a first position and a second position for coupling said first output shaft to said second output shaft, and wherein said secondary fluid circuit provides high pressure fluid to said mode operator.

21. The transfer case of claim 20 wherein said primary fluid circuit includes a pressure source and a first valve selectively coupling said pressure source to said inlet of said pressure intensifier, and wherein said secondary fluid circuit includes a first valve selectively coupling said outlet of said pressure intensifier to said range operator and a second valve selectively coupling said outlet of said pressure intensifier to said mode operator.

22. The transfer case of claim 21 wherein said primary fluid circuit further includes a second valve for selectively interconnecting said pressure source and an accumulator, said accumulator being positioned between said first valve and said second valve, and wherein said secondary fluid circuit includes a third valve coupling said mode operator and a reservoir, said third valve operable to release pressure on said mode operator.

* * * * *